T. A. WILLARD.
STORAGE BATTERY.
APPLICATION FILED JULY 6, 1915.
1,166,101.
Patented Dec. 28, 1915.
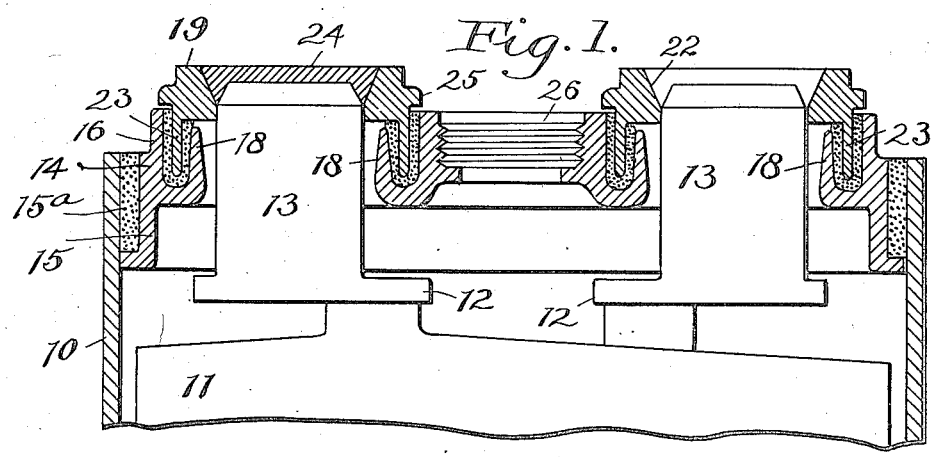
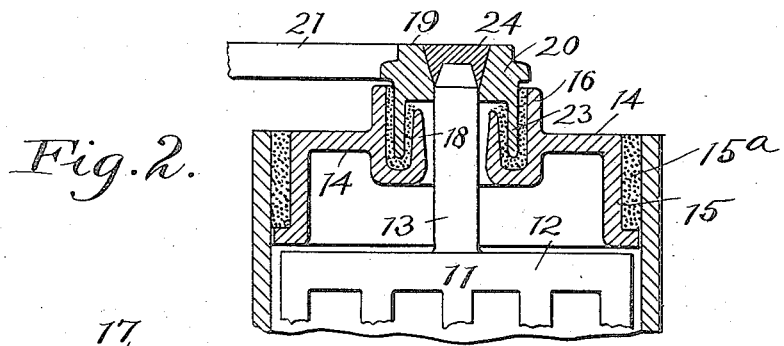
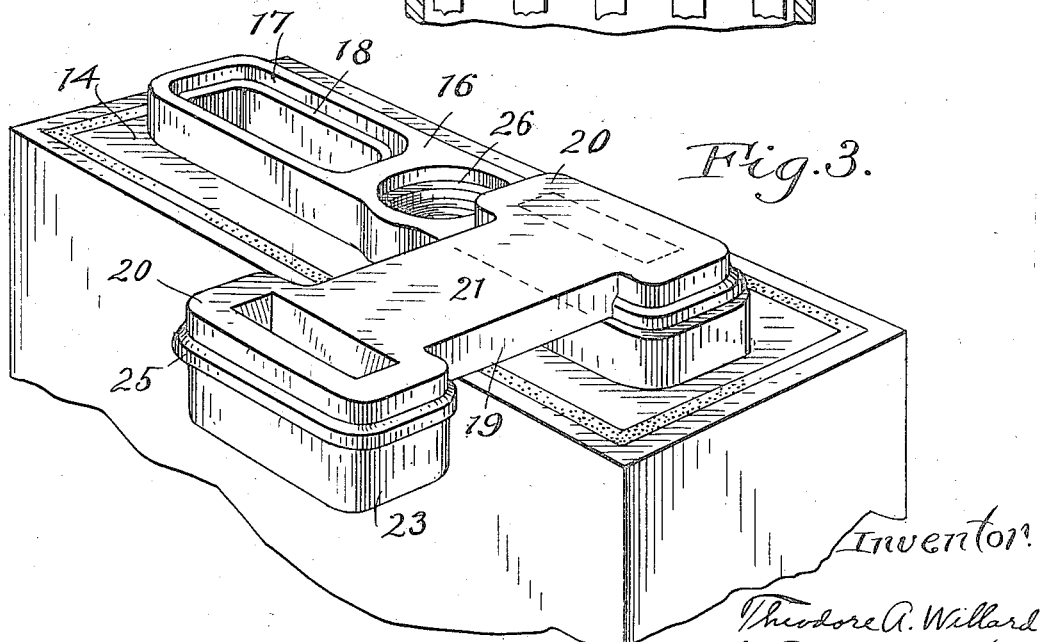
Inventor
Theodore A. Willard
by Thurston & Kwis
Attys.

UNITED STATES PATENT OFFICE.

THEODORE A. WILLARD, OF CLEVELAND, OHIO, ASSIGNOR TO THE WILLARD STORAGE BATTERY COMPANY, OF CLEVELAND, OHIO, A CORPORATION OF OHIO.

STORAGE BATTERY.

1,166,101.  Specification of Letters Patent.  Patented Dec. 28, 1915.

Application filed July 6, 1915. Serial No. 38,166.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries and has for one of its objects to so shape the terminal posts as well as the coöperating or surrounding parts, including the connectors which are fitted onto the posts and the flanged openings of the cover through which the posts extend, as to permit cells to be made narrower than heretofore possible with the round terminal posts, without reducing the cross-sectional dimensions and the current conducting capacity of the posts.

A still further object is to so shape or form the parts that the posts and connectors may be of ample cross-sectional dimensions with a very narrow cell.

A still further object is to provide certain improvements for automatically sealing the terminal post in the cover when the connector is placed in position thereon, the present construction being in this respect an improvement over the construction constituting the subject matter of my prior application Serial No. 24,634, filed April 29, 1915.

The invention may be briefly summarized as consisting in certain novel details of construction and combinations and arrangements of parts, which will be described in the specification and set forth in the appended claims.

In the accompanying sheet of drawings wherein I have shown the preferred embodiment of my invention, Figure 1 is a longitudinal sectional view through the upper portion of the cell constructed in accordance with my invention; Fig. 2 is a transverse sectional view of the same; and Fig. 3 is a perspective view of the same, with certain parts omitted and showing one of the cell connectors in place.

The battery includes a jar 10, which may be of rubber and which contains the usual positive and negative plates 11 connected together by straps 12, from which extend upwardly the positive and negative terminal posts 13. It will be observed that these terminal posts are rectangular in cross-section instead of round, as heretofore, and that they are considerably elongated in the direction of the length of the cell, as shown in Fig. 1, and have their shorter dimension in the direction of the width of the cell, as shown in Fig. 2.

The jar is provided with a cover 14 which may be of rubber, and which is provided at its edge or perimeter with a down-turned portion 15 which extends into the jar and is sealed therein by sealing compound $15^a$. The cover is provided further with a centrally and longitudinally disposed raised portion 16 which extends a suitable height above the top or top line of the cover, as shown perhaps most clearly in Fig. 3. This raised portion 16 is provided with two elongated and substantially rectangular openings 17 through which the elongated rectangular terminal posts extend, the top of the posts extending only a short distance above the top of the raised wall or portion 16, as shown in Figs. 1 and 2. The cover is provided further inside and adjacent to the walls forming the openings 17 with inner upturned flanges 18 which extend from a point or line below the top of the cover upwardly above the top of the cover, *i. e.*, above the upper horizontal surface from which the wall or flange of the raised part 16 extends. Each of these inner flanges 18 is rectangular in contour and is spaced on all sides from the terminal post 13 as well as from the outer surrounding wall or flange, so that there is provided around each terminal post spaced inner and outer walls or flanges forming an endless receptacle in the form of a groove which entirely surrounds the terminal post and extends both above and below the top or horizontal portion of the cover.

Fitted onto each terminal post is a connector 19 which may be either a cell connector, as here shown, adapted to connect together the positive and negative posts of adjacent cells, or a terminal connector to which is adapted to be connected the end of a flexible conductor. The cell connector here shown is composed of two body portions 20 and a cross bar 21. Each body portion is rectangular in cross section and is provided with an elongated rectangular socket 22 preferably tapered or beveled at the top, as shown, and each body portion is provided further with a depending rectangular shaped flange or petticoat 23 which extends down into the groove or receptacle formed between the flanges or walls 16 and 18. The lower part of the body portion 20 extends down into the top of the opening 17 somewhat below the top line of the outer flange or wall 16 and adjacent to the top line of the inner flange or wall 18.

Prior to placing the connector onto the post the receptacle or groove between the walls 16 and 18 is filled or partially filled with sealing compound, which, in order that the flange may be moved down into the groove through the sealing compound, is made somewhat plastic by warming the cover before the connector is placed in position. The connector is preferably lead-burned to the top of the post, the melted lead being shown at 24, and the heat imparted to the connector by lead-burning the latter to the post passes by conduction down along the depending flange or petticoat 23 and melts the sealing compound so that there is formed a very effective sealing of the terminal post as is more fully described in my prior application previously referred to. It will be observed that the body portion of the connector is provided in addition to the parts previously described, with a bead or rib 25 which is just above the top line of the wall or raised portion 16 and projects over and covers the sealing compound which is contained in the receptacle or groove.

The elevated part 16 of the cover is provided between the substantially rectangular terminal post opening 17 with an interiorly threaded circular vent plug opening 26 which is adapted to receive a vent plug not shown.

The above described construction, as before stated, admits of the cell being made very narrow, at the same time permits the use of terminal posts which are of ample cross-sectional area to carry the current even though a heavy current is drawn from the battery as is often the case with batteries employed in starting and lighting systems for automobiles. Additionally, the placing of the connector in position on the posts automatically seals the terminal posts against leakage or creepage of acid or battery solution to the exterior of the cover, and the construction is otherwise very satisfactory from mechanical standpoints, as it has the features of strength, durability and ease of assemblage.

Having described my invention, I claim:

1. In a storage battery, a cell comprising a jar, a cover for the jar provided with an elongated opening with its major dimension in the direction of the length of the cell and its minor dimension in the direction of the width of the cell, and a terminal post elongated in cross section extending through the elongated opening of the cover.

2. In a storage battery, a jar or container having a cover provided with an elongated substantially rectangular opening with its major dimension in the direction of the length of the cell and its minor dimension in the direction of the width of the cell, and a terminal post elongated and substantially rectangular in cross-section extending through the elongated opening of the cover.

3. In a storage battery, a cell comprising a jar of greater length than width, a cover for the jar having a pair of elongated substantially rectangular openings in line with each other and with their major dimensions in the direction of the length of the cell and their minor dimensions in the direction of the width of the cell, and a pair of terminal posts substantially rectangular in contour projecting through said openings.

4. In a storage battery, a container having a cover provided with an elongated opening with its major dimension in the direction of the length of the container and its minor dimension in the direction of the width of the container, a terminal post elongated in cross-section extending through the elongated opening of the cover, and a connector having an elongated socket receiving the upper end of the terminal post.

5. In a storage battery cell, a jar having a cover provided with an elongated opening with its major dimension in the direction of the length of the cell and its minor dimension in the direction of the width of the cell, a terminal post elongated in cross-section extending through the opening of the cover, a connector having a body provided with an elongated opening receiving the upper end of the post, said post and the openings in the cover and connector being substantially rectangular in contour.

6. In a storage battery, a jar or container having a cover provided with an opening for a terminal post and with a flanged wall surrounding said opening and projecting upwardly from the top of the cover so as to form a receptacle, a terminal post projecting upwardly through said opening, and a connector fitted onto the post and having a depending portion projecting downwardly below the top of said flanged wall and sealed in said receptacle.

7. In a storage battery, a jar having a cover provided with an opening for a terminal post and with inner and outer walls or flanges extending about said opening and projecting upwardly above the top line of the cover and forming between them a receptacle in the form of a groove, a terminal post projecting upwardly through said opening, and a connector fitted onto the said post and having a depending portion extending down between said flanges and sealed therein.

8. In a storage battery, a jar provided with a cover having an opening for a terminal post and with a pair of flanges or walls one within the other and both projecting from a point beneath the top of the cover upwardly above the top of the cover, a terminal post projecting upwardly through said opening, and a connector on the posts and having a depending portion which extends down between the flanges or walls and sealed therein.

9. In a storage battery, a jar provided with a cover having an opening for a terminal post, a pair of upstanding walls or flanges which surround the said opening and are spaced apart so as to form a receptacle in the form of a groove, a terminal post projecting upwardly through the opening, and a connector fitted onto the post and provided with a body portion which extends down into the space within the outer flange or wall and provided also with a portion which extends between said flanges or walls and is sealed therein.

10. In a storage battery, a jar provided with a cover having an opening for a terminal post and an upstanding flange or wall surrounding said opening, and a terminal post projecting through said opening and provided with a portion extending downwardly beneath the top of said flange or wall and within the same, and a portion extending laterally over the top of said flange or wall.

11. In a storage battery, a cover provided with an elongated opening and with an elongated receptacle surrounding the opening, a terminal post elongated in cross-section extending through said opening, and a connector fitted onto said post and having an elongated depending portion extending downwardly into said receptacle and sealed therein.

12. In a storage battery, a jar or container having a cover provided with a substantially rectangular opening for a terminal post and with a receptacle surrounding said post and substantially rectangular in contour, a terminal post substantially rectangular in cross-section extending through said opening, and a connector fitted onto the post and provided with a substantially rectangular socket receiving the end of the post and with a depending portion extending downwardly into said receptacle and sealed therein.

13. In a storage battery, a jar or container having a cover provided with an opening for a terminal post, a pair of flanges surrounding the opening and forming a receptacle, a terminal post extending upwardly through said opening, and a connector having a socket which receives the end of the post and having a depending portion extending into the receptacle and sealed therein, said terminal post, opening in the cover, receptacle, socket of the connector and depending portion thereof being substantially rectangular in contour.

14. In a storage battery, a jar or container having a cover provided with a centrally disposed longitudinally extending elevated portion provided with a pair of elongated terminal post openings with their major dimensions in the direction of the length of the jar.

15. In a storage battery, a cell comprising a jar having a cover with a centrally disposed longitudinally extending elevated portion having in alinement a pair of elongated substantially rectangular terminal post openings and an intermediate vent plug opening which is circular in cross-section, a pair of terminal posts substantially rectangular in cross-section projecting through said elongated openings, and a pair of connectors having body portions with substantially rectangular sockets fitted onto the upper ends of the terminal posts.

In testimony whereof, I hereunto affix my signature in the presence of two witnesses.

THEODORE A. WILLARD.

Witnesses:
L. I. PORTER,
A. J. HUDSON.